Jan. 14, 1947.  H. E. CARNAGUA ET AL  2,414,359
AUTOMATIC TRANSMISSION
Filed Dec. 16, 1943  3 Sheets-Sheet 1
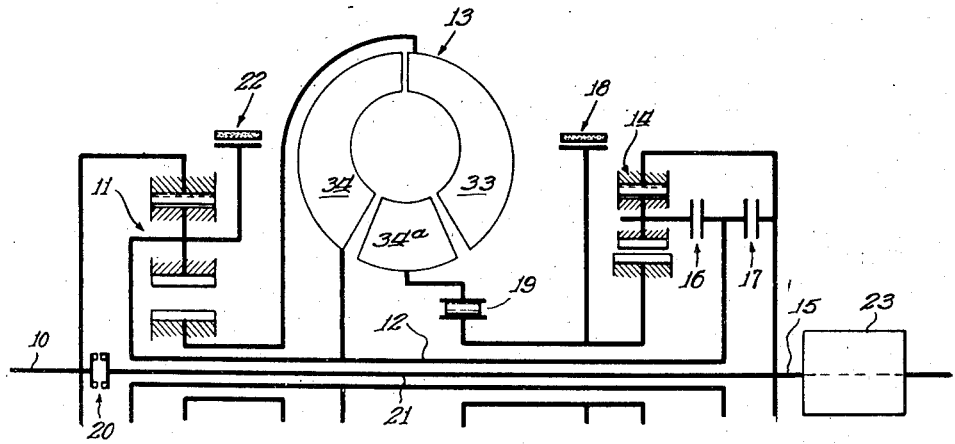
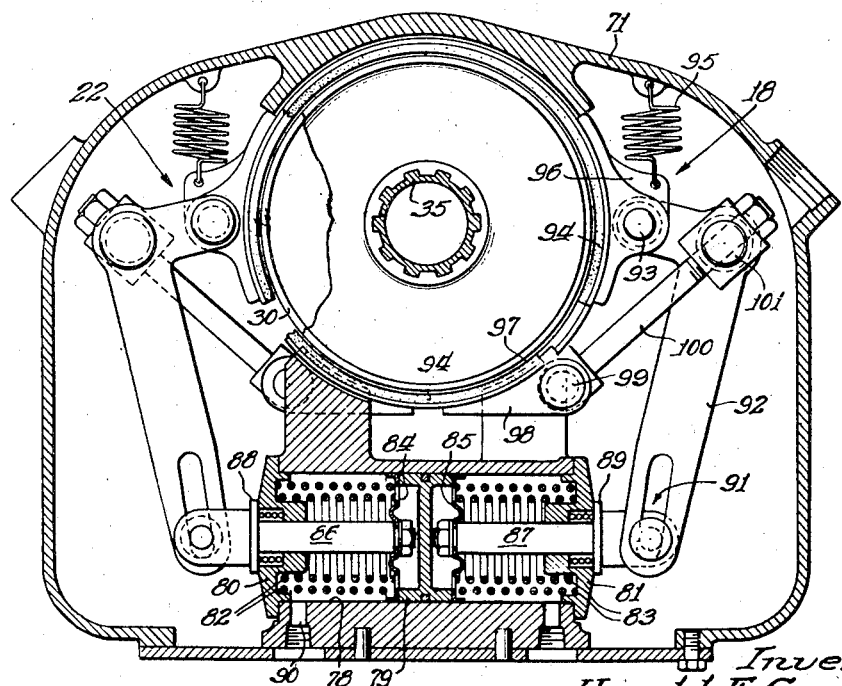
Inventors:
Harold E. Carnagua and
Donald W. Kelbel
By Edward C. Fritzbaugh

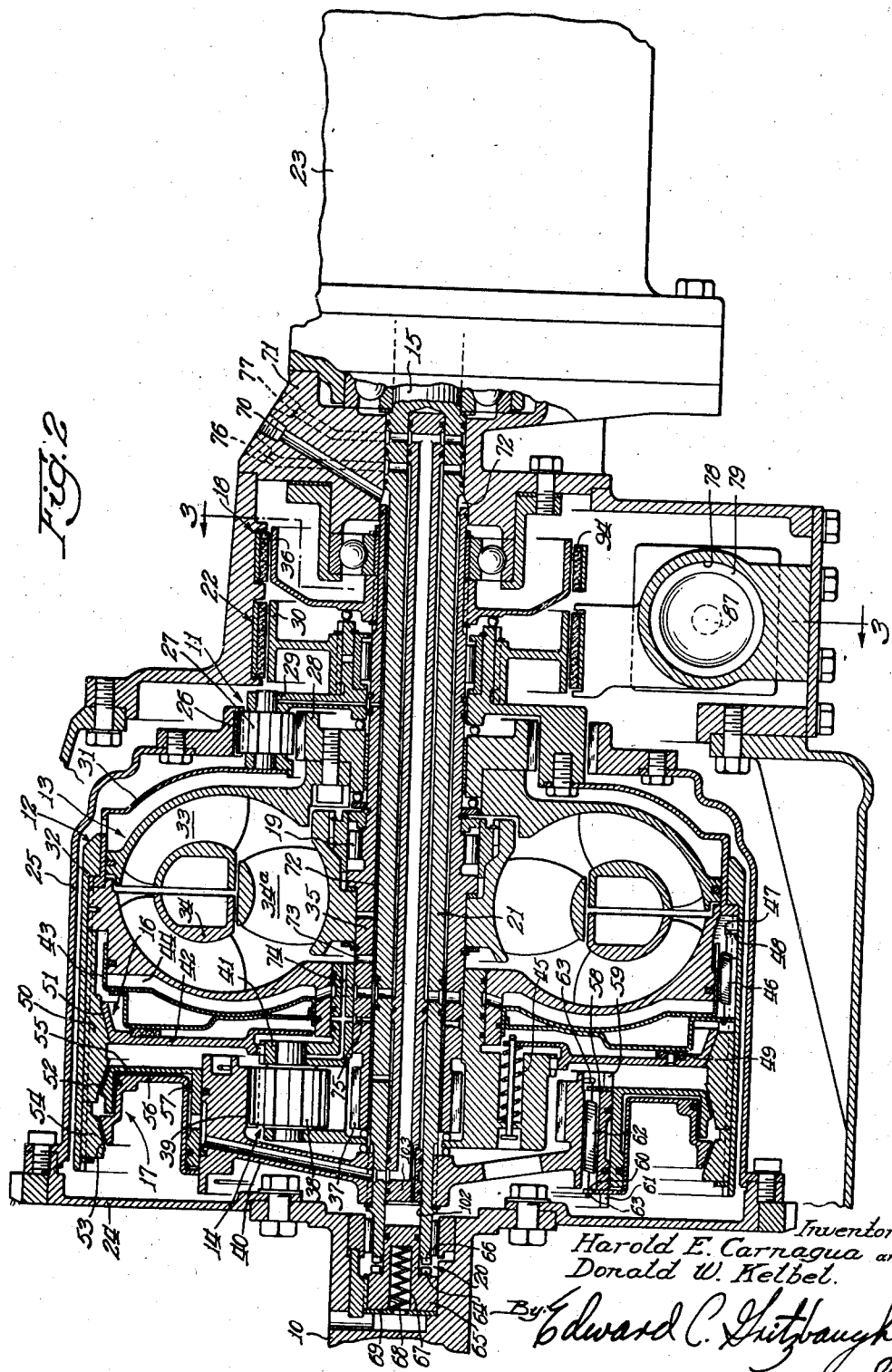

Jan. 14, 1947.  H. E. CARNAGUA ET AL  2,414,359
AUTOMATIC TRANSMISSION
Filed Dec. 16, 1943  3 Sheets-Sheet 3
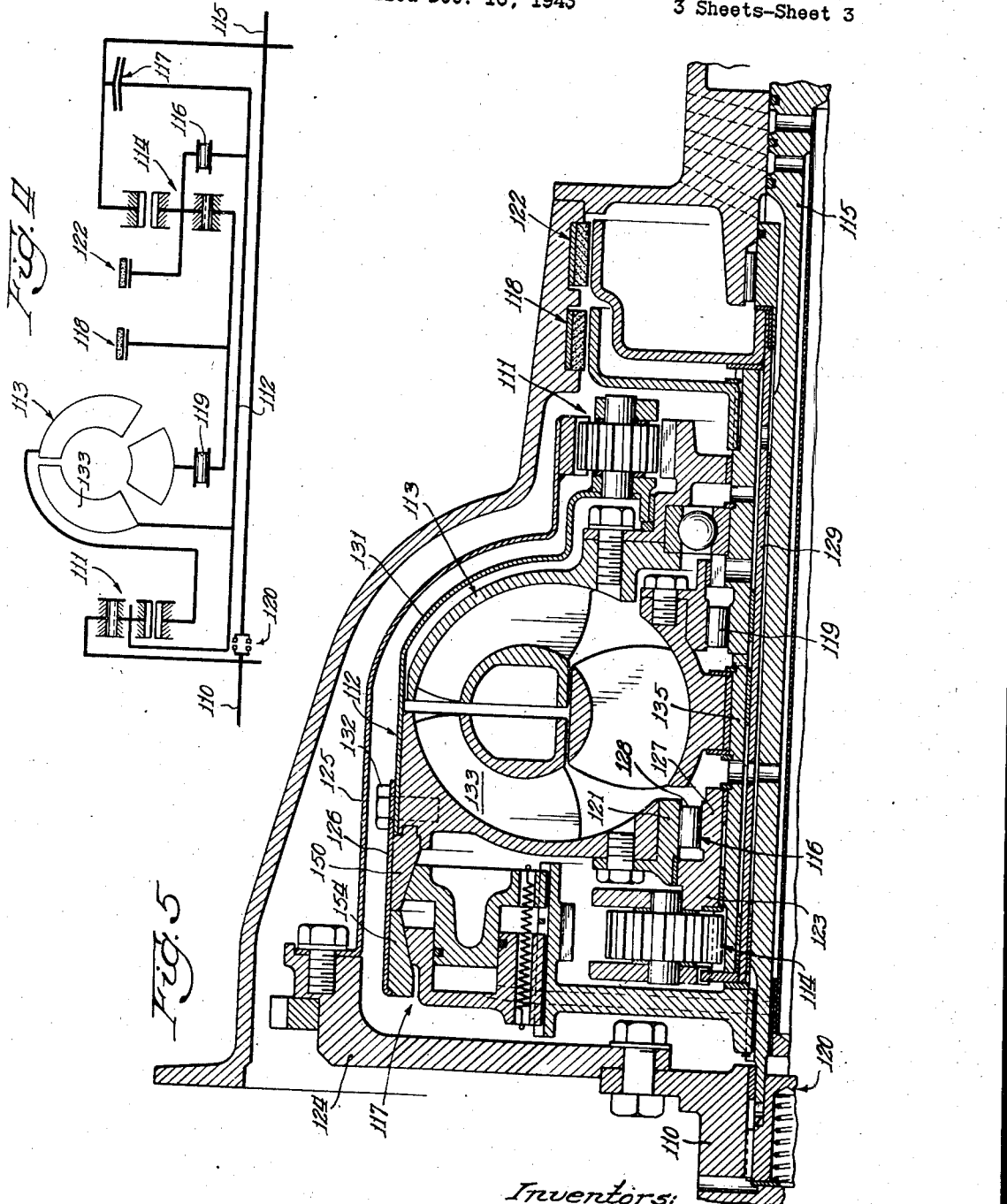
Inventors:
Harold E. Carnagua and
Donald W. Kelbel.
By: Edward C. Fritzbaugh
Atty.

Patented Jan. 14, 1947

2,414,359

UNITED STATES PATENT OFFICE 2,414,359

AUTOMATIC TRANSMISSION

Harold E. Carnagua and Donald W. Kelbel, Muncie, Ind., assignors to Borg-Warner Corporation, Chicago, Ill., a corporation of Illinois Application December 16, 1943, Serial No. 514,464

15 Claims. (Cl. 74—189.5)

This invention relates to power transmitting devices and particularly to such devices incorporating an infinitely variable hydro-dynamic device combined with gearing.

The principal object of this invitation is to provide a variable speed transmission for use with an internal combustion engine wherein an infinitely variable torque multiplying hydro-dynamic device is employed with gearing to provide a two-path power flow arrangement at all times for greater efficiency, with additional means for providing a neutral to prevent creep, a low range and a high range and also a reverse drive.

Another object of this invention is to provide, in a transmission employing an infinitely variable torque multiplying hydro-dynamic device combined with gearing, a friction clutch at the output of the torque multiplying device, said friction clutch being physically located between the torque converting device and the internal combustion engine with which the transmission is used so as to permit the use of a large diameter friction clutch without unduly increasing the size of the transmission casing.

Another object of this invention is to provide a more compact arrangement of the parts and to provide power shifting throughout the transmission.

These and other objects of this invention will become apparent from the following detailed description when taken together with the accompanying drawings in which:

Fig. 1 is a schematic functional diagram of the power transmitting elements of one embodiment;

Fig. 2 is a section taken through one embodiment of this invention;

Fig. 3 is a transverse section through the embodiment of Fig. 2 taken along line 3—3 of Fig. 2;

Fig. 4 is a functional diagram of another embodiment of this invention; and

Fig. 5 is a partial section taken through a transmission incorporating the features of the embodiment of Fig. 4.

Referring now to Fig. 1 for a functional description of the transmission, power from a prime mover, such as an internal combustion engine (not shown) is impressed upon an input shaft 10 which is connected directly to a power splitting differential 11, a portion of the power being transmitted mechanically to an intermediate structure or shaft 12 and the remainder being transmitted to an infinitely variable torque multiplying device such as a vaned-type hydrodynamic torque converter 13, the torque from torque converter 13 being combined in structure 12 with the portion transmitted directly thereto by the power splitting differential 11.

The torque in intermediate structure 12 may be again multiplied by means of planetary gearing 14 to provide a low range operation, or it may be transmitted directly to a driven shaft 15 for high range operation. Whether or not the torque is again multiplied depends upon the operation of friction clutches 16 and 17, friction clutch 16 serving to connect shaft 12 to the planetary gear set to effect a torque multiplication and clutch 17 serving to connect shaft 12 directly to the driven shaft 15 when no torque multiplication is desired.

The reaction for torque multiplication is provided by a brake 18 which has suitable connections to both the torque converter 13 and planetary gear set 14. However, a one-way connection 19 is used between brake 18 and torque converting device 13 so as to permit the entire device 13 to rotate forwardly without effecting any torque multiplication when the fluid conditions therein are propitious for such operation. It is contemplated that brake 18, when once applied for forward drive, will remain applied, and since the connection between brake 18 and planetary gear set 14 is a permanent connection, clutches 16 and 17 are mutually exclusively operable to prevent planetary gear set 14 from being locked up and held in braked position when direct drive is desired.

A direct connection including a ratchet clutch 20 and a shaft 21 is provided between driving and driven shafts 10 and 15 in order to crank the engine by turning driven shaft 15 for a push start. Clutch 20 is automatically engaged when drive shaft 10 is not rotating and is automatically disengaged when the engine is idling.

For reverse drive, a brake 22 is provided which is applied to the turbine element of the vaned torque converter 13 when the reaction element or stator thereof is not held against rotation by brake 18. With clutch 16 engaged and clutch 17 disengaged it will be observed that brake 22 also provides a reaction element for both planetary gear sets 11 and 14 as well as causing the turbine and reaction elements of the torque converter 13 to exchange functions so that the turbine element becomes the stator and the stator element becomes the turbine. The result is a reverse drive in driven shaft 15 through the converter 13 as will be described in detail hereinafter.

When this transmission is used in an automotive vehicle such as a passenger car, for example, it is contemplated that the rear axle ratio in the vehicle will be in the neighborhood of 4.25 to 1 and accordingly an overdrive mechanism 23 may be used between driven shaft 15 and the rear axle to slow down the engine at high vehicle speed.

Referring now to Fig. 2 for a detailed description of the embodiment of the elements described in Fig. 1, drive shaft 10 is connected to power splitting differential 11 by means of a fly-wheel 24 and a drum 25. The power splitting differential 11 is comprised of a ring gear 26 which is secured to drum 25 so as to be rotatable therewith and which meshes with one or more planet gears 27 each of which in turn meshes with another planet gear (not shown). The said other planet gears mesh with a sun gear 28. This form of dual planet gearing is well known in the art and its characteristics need not be described in detail here. Planet pinions 27 are mounted on a carrier 29 which is connected on one side to a brake drum 30 and on the other through a concave disc 31 to an inner drum 32.

Torque converter 13 is comprised of a pump element 33 which is bolted to sun gear 28, a turbine element 34 which is splined to drum 32 and a stator element 34a which is connected by means of the aforementioned one-way coupling device 19 to a shaft 35. A brake drum 36 is splined to the right-hand end (Fig. 2) of shaft 35, said drum constituting the rotatable element of brake 18.

The torque multiplying gear set 14 is comprised of a sun gear 37 which meshes with a group of planetary gears (not shown) which in turn meshes with a second group of planetary gears 38 to form a dual planetary gear set of the type shown at 11 and used as a power splitting device. Said second group of planetary gears 38 meshes with a ring gear 39 which drives output shaft 15 through the web 40. Planet pinions 38 are mounted on a carrier 41 which is splined to the driven element 42 of clutch 16. Said clutch 16 is of the conical type so as to have the greatest capacity for the smallest area of cooperating friction surfaces. The driven element 42 is operated by a piston 43, preferably made of stampings to reduce its rotational inertia, said piston forming a chamber 44 between itself and turbine element 34 into which fluid under pressure may be admitted. The fluid pressure acts in a direction to engage the clutch, and a spring 45, reacting against carrier 41, serves to disengage the clutch.

Piston 43 is retracted by means of a plurality of springs 46 tensioned between the piston and a loop of wire 47 retained in a groove 48 in turbine member 34. Contact between piston 43 and movable element 42 is established by means of a friction facing 49 which is riveted to movable element 42. The fixed element of clutch 16 is comprised of a ring 50 which is also splined to drum 32 and has a conical surface 51 adapted to cooperate with the conical surface on movable element 42, and another conical surface 52 which forms one of the axially fixed friction surfaces of clutch 17.

The connection between ring gear 39 and turbine element 34 as stated previously is effected by means of friction clutch 17. This clutch, in addition to the fixed conical surface 52, is provided with a second and oppositely inclined surface 53 formed in a ring 54 splined to drum 32. Cooperating with surfaces 52 and 53 are movable elements 55 and 56 which are so formed that element 55 provides an annular recess and element 56 constitutes an annular piston operating in said annular recess. Engagement of the clutch is effected by admitting fluid under pressure into the space 57 formed between the two elements so as to separate said elements, thereby causing the elements to engage surfaces 52 and 53. Element 55 is provided with lugs 58 which extend into a slot 59 in forging 40, and piston 56 is likewise provided with lugs 60 which extend into a slot 61 in forging 40 disposed opposite slot 59. The clutch is maintained in a retracted position by means of a series of springs 62 which are tensioned between a pair of hoops 63 positioned outside of lugs 58 and 60.

Clutch 20, which it will be recalled is used to start the engine from the driven shaft 15, is comprised of a set of ratchet teeth 64 formed in a piston 65 which is keyed to drive shaft 10, and a cooperating set of ratchet teeth 66 formed in the end of shaft 15. Said shaft 15 is bored to receive piston 65. A release spring 67 is received in an opening 68 and is compressed against an abutment 69 in shaft 10 to tend to maintain clutch 20 in an engaged condition. Thus whenever fluid pressure behind piston 65 is reduced below the force of the spring 67, clutch 20 will be engaged.

Fluid for disengaging clutch 20, for lubricating portions of the transmission and for filling torque converter 13 is obtained from a suitable source of fluid under pressure such as the engine oil pump and is conducted to a conduit 70 formed in housing 71 and leading to an annular space 72 formed between driven shaft 15 and shaft 35. Said annular space 72 is in communication through a conduit 73 with hydraulic torque converter 13, a conduit 74, a return conduit 75 and the series of conduits and spaces shown in Fig. 2 which eventually reach a space behind piston 65. Fluid for operating clutch 16 is admitted from the same source of fluid under pressure through suitable valving (not shown) to a conduit 76 in casing 71 and connecting conduits and spaces as shown in Fig. 2 to the space 44 behind pistons 43. Fluid under pressure for operating clutch 17 is obtained likewise through suitable valving (not shown) from the same fluid source and conducted through conduit 77 to a series of connected conduits as shown in Fig. 2 to the space 57 behind piston 56.

To simplify the drilling of the driven shaft 15 for the various conduits and passageways, driven shaft 15 is drilled with one continuous bore 102 into which is fitted a long plug 103, the plug being previously formed with portions of reduced diameter and with a central passageway having appropriate openings to the exterior at either end.

Brakes 18 and 22 are shown to advantage in Fig. 3. Said brakes comprise a cylinder 78 formed in housing 71 in which is a double acting piston 79. The ends of cylinder 78 are closed off by end plates 80 and 81 and resilient means such as coil springs 82 and 83 are compressed between piston 79 and end plates 80 and 81. The pressure of springs 82 and 83 is not taken directly by piston 79 but by apertured stampings 84 and 85 each of which is anchored to a piston rod 86 and 87 respectively. Said rods are provided with shoulders 88 and 89, respectively, which limit the inward movement of the rods. In order to move one of the rods, for example rod 87, outward, fluid under pressure is admitted through a conduit 90 into the opposite half of cylinder 78 and the fluid then passes through the apertured stampings 84 to piston 79, thereby forcing the piston to the right as viewed in Fig. 3 against stamping 85 to move rod 87 outward. A similar arrangement of parts is used to cause piston rod 86 to be moved to the left as shown in Fig. 3.

The movement of each rod is transmitted to the respective brakes by suitable linkage. As an example of one form of linkage, rod 87 is connected through a pin-and-slot connection 91 to a bell crank 92 which is pivoted at 93 to an anchor block brake band 94. Said brake band 94 cooperates with drum 36 of brake 18. A spring 95 tensioned between housing 71 and a lug 96 on anchor 94 tends to rotate the end secured thereto in a counterclockwise direction as viewed in Fig. 3. The opposite end 97 of brake band 94 is secured to an anchor block 98 which is pivotally connected at 99 to a tension rod 100, said rod being pivoted at its opposite end 101 to bell crank 92. It will be apparent from the arrangement of the various links and anchor blocks that when piston rod 87 is moved to the right as viewed in Fig. 3 the ends of the brake band will be drawn together to effect its tightening about its associated drum, thereby causing the brake to become operative to arrest the rotation of shaft 35. It will also be observed that spring 83 in cylinder 79 and spring 95 will tend to release the brake. A similar arrangement may be used to operate the brake 22.

Details of the overdrive mechanism 23 are not given here since it is contemplated that the overdrive will be of standard design such as has been on the market for many years.

The transmission herein described provides a definite neutral through the disconnection of the turbine element 34 from the planetary gear set 14 and hence when properly controlled the transmission will not creep as is customary in hydrodynamic transmissions which are directly connected to an internal combustion engine. The arrangement of parts is such that although the clutch 16 is required to transmit more than engine torque and hence must be sufficiently large to carry this load it is located adjacent the flywheel where ample room is available although functionally it is associated directly with the driven shaft. Clutch 17 which is required to carry only engine torque, is located adjacent clutch 16 and likewise does not unduly increase the size of the transmission. Although both clutches may be engaged abruptly, the torque at all times is transmitted, at least partly, through the torque converter 13 which is inherently a shock absorbing device and hence no excessive shocks will be transmitted to the frame of the vehicle when these clutches are operated.

Referring now to the embodiment shown on Figs. 4 and 5, and particularly to the functional diagram of Fig. 4, it will be observed that a freewheel clutch has been substituted for the friction clutch 16 of Fig. 1, and that the reverse brake is attached directly to the carrier of the torque multiplying differential. This results in a simpler and more compact transmission although the controls are different in order to prevent creep. Specifically, the second embodiment is comprised of a drive shaft 110 which is connected directly to a power splitting differential 111, a portion of the power being transmitted mechanically to an intermediate structure 112 and the remainder being transmitted to an infinitely variable torque multiplying device such as a vaned type of hydro-dynamic torque converter 113, the torque from converter 113 being combined in intermediate structure 112, with the portion transmitted directly thereto by the power splitting differential 111.

The torque in intermediate shaft 112 may be again multiplied by means of planetary gearing 114 to provide a low range operation, or it may be transmitted directly to a driven shaft 115 for a high range. The power from intermediate structure 112 is transmitted to planetary gearing 114 through a one-way clutch 116 which is arranged to prevent structure 112 from rotating ahead of gearing 114 but will release when said gearing is rotated faster than structure 112. A friction clutch 117 serves to connect structure 112 directly to the driven shaft 115 when no torque multiplication is desired.

The reaction for torque multiplication is provided by a brake 118 which has suitable connections to both the torque converter 113 and the planetary gear set 114. A one-way connection 119 is used between brake 118 and the torque converting device 113 so as to permit the entire device 113 to rotate forwardly without effecting any torque multiplication when the fluid conditions therein warrant such operation. As in the previously described modification, it is contemplated that brake 118, when once applied for forward drive, will remain applied during forward drive, but changes from low to high range can nevertheless be readily made, the connection between structure 112 and planetary gear set 114 being automatically released by one-way clutch 116. A direct connection ratchet clutch similar to the one shown in Fig. 2 may be used between drive shaft 110 and driven shaft 115 for push start purposes and is shown at 120 in Fig. 4.

For reverse drive a brake 122 is provided which is applied to the turbine element of the vaned torque converter 113 through one-way clutch 116 when the brake 118 is released. Since one-way clutch 116 does not permit structure 112 to rotate ahead of the gearing 114, the clutch will be effective to hold the turbine element.

Referring now to Fig. 5 for a detailed description of the second embodiment of the invention, planetary gear sets 111 and 114 are of the dual planet type as described with reference to the embodiment of Fig. 2, and the connection between drive shaft 110 and planetary gear set 111 is effected through a flywheel 124 and a drum 125. The connection between planetary gear set 111 and hydraulic torque converter 113 corresponding to intermediate structure 112 is effected by means of a second drum 131, the second drum however, being bolted as shown at 132 to the turbine element 133 of the converter instead of splined as in the first embodiment. The same bolt 132 also secures a second drum 126 to the first drum 131, said second drum serving to support and retain against axial motion oppositely tapered clutch rings 150 and 154.

It will be noted that turbine element 133 does not have associated with it a clutch corresponding to clutch 16 of Fig. 2 but is provided instead with a hub portion 121 which comprises the cylindrical race of one-way clutch 116 and that carrier 123 of planetary gear set 114 has a lateral extension 127 in which the cams of clutch 116 are formed. Rollers 128 operate between the race and cams to lock the turbine element 133 to carrier 123 when the turbine element tends to rotate ahead of the carrier, and to free the turbine element when the carrier 123 tends to rotate ahead of the turbine.

The brake operating mechanism for brakes 118 and 122 may be similar to that shown in Fig. 3.

The remainder of the transmission shown in Fig. 5 is similar to that shown in Fig. 2 with the exception of a sleeve 129 which is inserted between driven shaft 115 and a shaft 135 directly connected to brake 118 and which constitutes the reaction member for the torque converter 113 and the planetary gear set 114. Said sleeve 129 connects brake 122 directly to carrier 123 of planetary gear set 114 to hold the latter and its associated turbine element 133 against rotation for reverse drive.

It will be observed that the operating linkages of brakes 18 and 22 are of the servo type, thus requiring less pressure in the operating cylinders. As the brake bands take hold, they will rock around and lock with a greater force than that supplied by the oil pressure alone.

It is understood that various anti-friction bearing seals, fasteners, etc., may be used as desired or required throughout both embodiments of the transmission. It is understood further that the foregoing description is merely illustrative of a preferred embodiment of the invention and that the scope of the invention therefore is not to be limited thereto but it is to be determined by the appended claims.

We claim:

1. A variable speed transmission comprising drive and driven elements, a power splitting differential, an infinitely variable torque multiplying device, a stepped-type mechanical torque multiplying device and a clutch connected in series functionally, with the power splitting differential being connected to the drive element and the clutch being connected to the driven element, and means effecting such series connection, said means disposing said power-splitting differential remote from the drive element and the clutch adjacent to said drive element.

2. A variable speed transmission as described in claim 1, said stepped-type mechanical torque multiplying device being nested within the clutch to reduce the length of the transmission.

3. A variable speed transmission comprising input and output structures, a power splitting differential connected to the input structure, an intermediate structure connected to the differential to receive a part of the power, a torque multiplying device connected to the differential to receive the remainder of the power, means connecting the torque multiplying device to the intermediate structure to recombine the power, a second torque multiplying device having reaction, input, and output members; means connecting the output member to the output structure, and selective means for connecting the intermediate structure either to the input member or to the output structure to secure either a further multiplication of torque or a direct drive.

4. A variable speed transmission comprising input and output structures, a power splitting differential connected to the input structure, an intermediate structure connected to the differential for receiving a part of the power a torque multiplying device connected to the differential to receive the remainder of the power, means connecting the torque multiplying device to the intermediate structure to recombine the power; a second differential having reaction, input, and output members and adapted to multiply torque; means connecting the output member to the output structure, friction clutch means for connecting the intermediate structure to the input member to secure a torque multiplication in the second differential, and a second clutch for connecting the intermediate structure directly to the output structure to bypass the second differential.

5. A variable speed transmission comprising input and output structures, a power splitting differential connected to the input structure, an intermediate structure connected to the differential for receiving a part of the power, a torque multiplying device connected to the differential to receive the remainder of the power, means connecting the torque multiplying device to the intermediate structure to recombine the power, a second torque multiplying device having reaction, input, and output members; means connecting the output member to the output structure, friction clutch means for connecting the intermediate structure either to the input member or to the output structure to secure either a further multiplication of torque or a direct drive, and means for interchanging the functions of the reaction and output members for reverse drive, the reaction member being driven backwardly by the first mentioned torque multiplying device in reverse drive.

6. A variable speed transmission comprising input and output structures, a power splitting differential connected to the input structure, an intermediate structure connected to the differential for receiving a part of the power, a torque multiplying device connected to the differential to receive the remainder of the power, means connecting the torque multiplying device to the intermediate structure to recombine the power, a second torque multiplying device having reaction, input, and output members; means connecting the output member to the output structure, and selective means for connecting the intermediate structure either to the input member or to the output structure to secure either a further multiplication of torque or a direct drive, said input structure including a drum which encloses the first and second torque multiplying devices and the selective means.

7. A variable speed transmission comprising an input shaft, an output shaft aligned with and piloted in the end of said input shaft, a differential, a hydrodynamic torque converter adjacent the differential, a friction clutch adjacent the hydrodynamic torque converter, and a second differential adjacent the clutch, said differentials, torque converter and clutch being arranged concentrically with respect to the output shaft, and means connecting said first differential to the input shaft, said first differential being remote from the input shaft, said second differential being positioned adjacent said input shaft, and the hydrodynamic torque converter and clutch being disposed between the differentials; means operatively connecting the first differential to the torque converter, clutch and second differential; and a drum connecting the input shaft to the first differential, said drum completely enclosing the torque converter, clutch and first differential.

8. A variable speed transmission comprising an input shaft, an output shaft aligned with and piloted in said input shaft, a planetary gear set coaxial with the driven shaft and spaced from the input shaft, a drum connecting the input shaft to the planetary gear set, a second drum within the first drum and connected at one end to the planetary gear set, a hydrodynamic torque converter within the second drum and connected thereto and to the planetary gear set, a second planetary gear set positioned between the torque converter and the input shaft, clutch means for connecting the second planetary gear set to the second drum, and means for connecting the second planetary gear set to the output shaft.

9. A variable speed transmission as described in claim 8, said first and second planetary gear sets comprising ring, sun and planet gears and a carrier for the planet gears; the first-mentioned drum being connected to the ring gear of the first panetary gear set, the second drum being connected to the carrier of the first planetary gear set, the clutch being connected to the carrier of the second planetary gear set, the output shaft being connected to the ring gear on the second planetary gear set, the sun gear of the second planetary gear set constituting the reaction element for the transmission, and the sun gear of the first planetary gear set constituting the connection between said first planetary gear set and the hydrodynamic device.

10. A variable speed transmission as described in claim 8, and clutch means for connecting the second drum directly to the driven shaft to render the second planetary gear set ineffective.

11. A transmission as described in claim 8, and a clutch for directly connecting the driven shaft to the second drum to render the second planetary gear set ineffective, said last-mentioned clutch being telescoped over the second planetary gear set.

12. A variable speed transmission comprising an input shaft, an output shaft coaxial with and piloted in the input shaft, a planetary gear set comprising ring, planet and sun gears and a carrier for the planet gears; a hydraulic torque converter comprising pump, turbine and stator elements; a second planetary gear set comprising ring, planet and sun gears and a carrier for the planet gears; a drum connecting the input shaft to the ring gear of the first planetary set, a drum connecting the carrier of the first planetary gear set to the turbine element of the hydraulic torque converter, means connecting the pump element to the sun gear of the first planetary gear set, a clutch within the second drum and adapted to connect said drum to the carrier of the second planetary gear set which is also positioned within the second drum, means for connecting the ring gear of the second planetary gear set to the output shaft, a brake outside of the drums and adapted to be connected to the stator and to the sun gear of the second planetary gear set to provide a reaction therefor, and a second brake, also outside of the drums, and directly connected to the carrier of the first mentioned planetary gear set.

13. A power transmitting mechanism comprising input and output structures, a differential gear set comprising ring, sun and dual planet gears and a carrier for the planet gears, means connecting the ring gear to the output structure, a torque multiplying device, means connecting the device to the input structure, a brake for the sun gear to provide a reaction for torque multiplication in the gear set, a two-way clutch for connecting the torque multiplying device to the output structure when no torque multiplication is desired in the gear set, and a one-way clutch in parallel with said two-way clutch and effective to connect the carrier to the torque multiplying device when the two-way clutch is released.

14. A power transmitting mechanism comprising input and output structures, a differential gear set comprising ring, sun and dual planet gears and a carrier for the planet gears, means connecting the ring gear to the output structure, a torque multiplying device having alternative reaction elements, one of said elements when held against rotation causing the second element to rotate forwardly and the second element when braked causing the first element to rotate reversely, means connecting the device to the input structure, means connecting the first said reaction element to the sun gear, a two-way clutch for connecting the second element to the output structure, a one-way clutch for connecting the second element to the carrier when the two-way clutch is disengaged, brake means for the sun gear to provide a reaction for torque multiplication, and brake means for the carrier to cause the first element to act as a reaction element, the reaction on the carrier brake means being in a direction to render the one-way clutch means effective.

15. A power transmitting mechanism comprising input and output structures, a differential gear set comprising ring, sun and dual planet gears and a carrier for the planet gears, means connecting the ring gear to the output structure, a hydrodynamic torque converter having pump, turbine and stator elements, means connecting the pump element to the input structure, a brake for the sun gear to provide a reaction for torque multiplication in the gear set, a two-way clutch for connecting the converter to the output structure when no torque multiplication is desired in the gear set, a one-way coupling effective to connect the carrier to the turbine element when the turbine element is the driver, and a brake for holding the carrier against rotation, said brake being effective through the one-way coupling to hold the turbine element against rotation, whereby the functions of the turbine and stator elements may be interchanged to produce a reverse drive in the output structure.

HAROLD E. CARNAGUA.
DONALD W. KELBEL.